US012619871B2

(12) United States Patent
Puri et al.

(10) Patent No.: US 12,619,871 B2
(45) Date of Patent: May 5, 2026

(54) INTERPRETABLE NEURAL NETWORK ARCHITECTURE USING CONTINUED FRACTIONS

(71) Applicant: International Business Machines Corporation, Armonk, NY (US)

(72) Inventors: Isha Puri, Chappaqua, NY (US); Amit Dhurandhar, Yorktown Heights, NY (US); Tejaswini Pedapati, White Plains, NY (US); Karthikeyan Shanmugam, Elmsford, NY (US); Dennis Wei, Sunnyvale, CA (US); Kush Raj Varshney, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 17/806,188

(22) Filed: Jun. 9, 2022

(65) Prior Publication Data
US 2023/0401438 A1     Dec. 14, 2023

(51) Int. Cl.
*G06N 3/08*     (2023.01)
*G06N 3/04*     (2023.01)

(52) U.S. Cl.
CPC ................. *G06N 3/08* (2013.01); *G06N 3/04* (2013.01)

(58) Field of Classification Search
CPC ............. G06N 3/08; G06N 3/04; G06N 3/084
See application file for complete search history.

(56) References Cited

U.S. PATENT DOCUMENTS

| | | | | |
|---|---|---|---|---|
| 2020/0279129 A1* | 9/2020 | Batchelor | ............ | G05B 13/027 |
| 2021/0390382 A1 | 12/2021 | Kwon | | |
| 2022/0366284 A1* | 11/2022 | Adam | .................... | G06N 20/00 |

FOREIGN PATENT DOCUMENTS

| | | |
|---|---|---|
| CN | 1797442 A | 7/2006 |
| CN | 102901651 B | 12/2015 |
| CN | 109948262 A | 6/2019 |

OTHER PUBLICATIONS

Zardecki, Andrew, "Continued Fractions in Time Series Forecasting", 2000, Studies in Fuzziness and Soft Computing, vol. 38, 17 pages (Year: 2000).*

(Continued)

*Primary Examiner* — Jennifer N Welch
*Assistant Examiner* — Vijay M Balakrishnan
(74) *Attorney, Agent, or Firm* — Elliot J. Shine

(57)     ABSTRACT
A method, a neural network, and a computer program product are provided that provide training of neural networks with continued fractions architectures. The method includes receiving, as input to a neural network, input data and training the input data through a plurality of continued fractions layers of the neural network to generate output data. The input data is provided to each of the continued fractions layers as well as output data from a previous layer. The method further includes outputting, from the neural network, the output data. Each continued fractions layer of the continued fractions layers is configured to calculate one or more linear functions of its respective input and to generate an output that is used as the input for a subsequent continued fractions layer, each continued fractions layer configured to generate an output that is used as the input for a subsequent layer.

13 Claims, 7 Drawing Sheets

(56) References Cited

OTHER PUBLICATIONS

Zhang, Daiyuan, "Training Neural Networks by Continued Fractional Weight Functions", Sep. 2013, Applied Mechanics and Materials, vols. 411-414, pp. 1986-1989, 10.4028/www.scientific.net/AMM.411-414.1986, 4 pages (Year: 2013).*

Hunter, John, "Chapter 10—Power Series", archived Dec. 6, 2013 at the Wayback Machine, University of California Davis Department of Mathematics, https://www.math.ucdavis.edu/~hunter/intro_analysis_pdf/ch10.pdf, 17 pages (Year: 2013).*

Encyclopedia of Mathematics, "Continuant", Dec. 12, 2013, https://encyclopediaofmath.org/wiki/Continuant, 3 pages (Year: 2013).*

Thomas, Rachel, "Maths in a minute: Continued fractions", Oct. 2, 2015, University of Cambridge, https://plus.maths.org/content/maths-minute-continued-fractions, 4 pages (Year: 2015).*

Lee, Jaehoon et al., "Deep Neural Networks as Gaussian Processes", Mar. 3, 2018, arXiv:1711.00165v3, 17 pages (Year: 2018).*

Majewski, J. et al., "Implementing Polynomial Expressions by means of Reciprocal-Function-Based Neural Networks", Sep. 2011, Signal Processing Algorithms, Architectures, Arrangements, and Applications SPA 2011, 5 pages (Year: 2011).*

Vaughan, J. et al., "Explainable Neural Networks based on Additive Index Models", Jun. 5, 2018, arXiv:1806.01933v1, 11 pages (Year: 2018).*

Agarwal, R. et al., "Neural Additive Models: Interpretable Machine Learning with Neural Nets", Oct. 24, 2021, arXiv:2004.13912v2, 23 pages (Year: 2021).*

Grace Period Disclosure: Isha Puri, Amit Dhurandhar, Tejaswini Pedapati, Karthikeyan Shanmugam, Dennis Wei, Kush R. Varshney. (Dec. 6, 2021). CoFrNets: Interpretable Neural Architecture Inspired by Continued Fractions. 35th Conference on Neural Information Processing Systems. 13 pages. https://research.ibm.com/publications/cofrnets-interpretable-neural-architecture-inspired-by-continued-fractions.

Saffarimiandoab, Farzin & Mattesini, Riccardo & Fu, Wanyi & Engin, Ercan & Ab, Kuruoglu & Zhang, Xihui. (2020). Interpretable machine learning modeling of capacitive deionization for contribution analysis of electrode and process features †. Journal of Materials Chemistry A. 9. 2259-2268. 10.1039/D0TA09531A.

Barrow John D. "Chaos in Numberland: The secret life of continued fractions", plus bringing mathematics for life, Jun. 1, 2000, 10 pages.

Brocot Achille. "Calcul des rouages par approximation", Nouvelle méthode, Source gallica.bnf.fr / Bibliothèque nationale de France, 1862, 98 pages.

Cuyt et al. "Handbook of continued fractions for special functions", Springer, Feb. 2007, 430 pages.

Euler Leonhard. "On the Transformation of Infinite Series to Continued Fractions", Department of Mathematics, The Ohio State University, Jul. 11, 2004, 40 pages.

John. "Continued fractions as matrix products", John D Cook Consulting, Jun. 15, 2022, 3 pages.

Jones et al. "Continued Fractions", Encyclopedia of Mathematics and its Applications, 1980, 47 pages.

Lehmer et al. "On Factoring Large Numbers", Brown University, Apr. 11, 1931, 7 pages.

Moore Charles G. "An Introduction to Continued Fractions", U.S. Department of Health. Education & Welfare office of Education, 1964, 103 pages.

No Author. "How to Find Continued Fraction of Pi", Mathematics, Mar. 18, 2014, 7 pages.

Poorten Alfred J. Van Der. "Elliptic curves and continued fractions", arXiv:math/0403225 [math.NT], Jul. 16, 2004, 16 pages.

Puri et al. "CoFrNets: Interpretable Neural Architecture Inspired by Continued Fractions", arXiv:2506.05586 [cs.LG], Jun. 5, 2025, 19 pages.

Shi Andrew. "Numerical Analysis (Math 128a)", University of California, Berkeley, Aug. 30, 2024, 170 pages.

* cited by examiner

INTERPRETABLE NEURAL NETWORK ARCHITECTURE USING CONTINUED FRACTIONS

STATEMENT REGARDING PRIOR DISCLOSURES BY THE INVENTOR OR A JOINT INVENTOR (if applicable)

The following disclosure(s) are submitted under 35 U.S.C. 102(b)(1)(A):

DISCLOSURE(S): Title: CoFrNets: Interpretable Neural Architecture Inspired by Continued Fractions, Authors: Isha Puri, Amit Dhurandhar, Tejaswini Pedapati, Karthikeyan Shanmugam, Dennis Wei, Kush R. Varshney, Publisher: Conference on Neural Information Processing Systems (NeurIPS 2021), Date: Dec. 7, 2021.

BACKGROUND

The present disclosure relates to neural networks, and more specifically, to an interpretable neural network using continued fractions.

An artificial neural network (or simply neural network) consists of an input layer of neurons (or nodes, units), one or two (or even three) hidden layers of neurons, and a final layer of output neurons. In a typical neural network architecture, lines connect to neurons, where each connection is associated with a numeric number called weight. The output of each neuron is computed using an activation (or transfer) function. The purpose of the activation function is, besides introducing nonlinearity into the neural network, to bound the value of the neuron so that divergent neurons do not paralyze the neural network.

In mathematics, a continued fraction is an expression obtained through an iterative process of representing a number as the sum of its integer part and the reciprocal of another number, then writing this other number as the sum of its integer part and another reciprocal, and so on. In a finite continued fraction (or terminated continued fraction), the iteration/recursion is terminated after finitely many steps by using an integer in lieu of another continued fraction. In contrast, an infinite continued fraction is an infinite expression. In either case, all integers in the sequence, other than the first, must be positive.

SUMMARY

Embodiments of the present disclosure include a method that provides training for neural networks with continued fractions architectures. The method includes receiving, as input to a neural network, input data and training the input data through a plurality of continued fractions layers of the neural network to generate output data. The input data is provided to each of the continued fractions layers, as well as output data from a previous layer. The method further includes outputting from the neural network the output data. Each continued fractions layer of the continued fractions layers is configured to calculate one or more linear functions of its respective input and to generate an output that is used as the input for a subsequent continued fractions layer. Each continued fractions layer is configured to generate an output that is used as the input for a subsequent layer.

Additional embodiments of the present disclosure include a computer program product method that provides training of neural networks with continued fractions architectures, one or more computer-readable storage medium, and program instructions stored on the one or more computer-readable storage media, the program instruction executable by a processor to cause the processor to receive, as input to a neural network, input data and train the input data through a plurality of continued fractions layers of the neural network to generate output data. The input data is provided to each of the continued fractions layers, as well as output data from a previous layer. The computer program product further includes instructions to output, from the neural network, the output data. Each continued fractions layer of the continued fractions layers is configured to calculate one or more linear functions of its respective input and to generate an output that is used as the input for a subsequent continued fractions layer, each continued fractions layer is configured to generate an output that is used as the input for a subsequent layer.

Further embodiments of the present disclosure include a neural network with continued fractions inspired architecture. The continued fractions architecture can encompass a full-fledged variant where each layer receives the entire input layer at every stage. Another continued fractions architecture can encompass a diagonalized variant where each layer only receives one of the input dimensions of the input layer, making it an additive model. Another continued fractions architecture encompasses a combination of the diagonalized variant and the full variant. The full layers are of increasing depth and can be understood the capture the respective order of interactions. The neural network can be implemented within a system that includes a memory, a processor, and local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
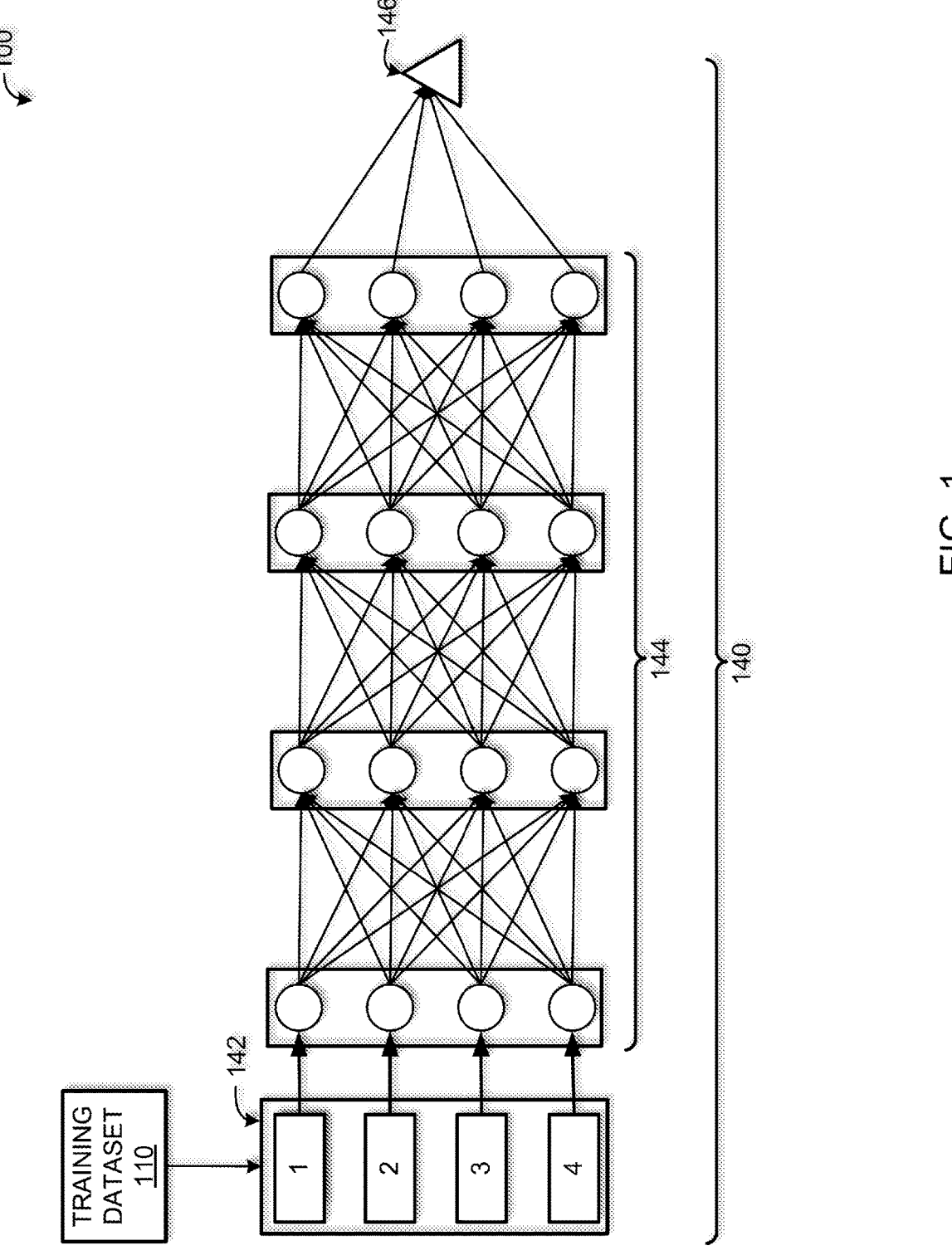
FIG. 1 is a block diagram illustrating an operation of the primary operational elements of training a neural network and used by one or more embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to neural networks, and more specifically, to an interpretable neural network using continued fractions. While the present disclosure is not necessarily limited to such applications, various aspects of the disclosure may be appreciated through a discussion of various examples using this context.

Interpretability can be described as the degree to which a human can understand the cause of a decision. The higher the interpretability of a machine learning model, the easier it is for someone to comprehend why certain decisions or predictions have been made. A model can be seen as being more interpretable than another model if its decisions are easier for a human to comprehend than the other model. As such, interpretable machine learning can be seen as the extraction of relevant knowledge from a machine learning model concerning relationships either contained in data or learned by the model.

There are numerous types of interpretable machine learning methods. For instance, standard machine learning models such as logistic regression, decision trees, and rule-based models are globally interpretable. Generalized additive models (GAMs) and their more recent variants, such as neural additive models (NAMs) and explainable boosted machines (EBMs also belong to this category). LassoNet is one of the most recently proposed architectures that can be considered interpretable. However, it is restrictive in the sense that if a feature is not selected by itself, it will not appear in any interaction terms. This can preclude accurate estimation of functions that have only interaction terms, including simple bivariate functions.

Interpreting neural networks differs from traditional machine learning methods. To start, a neural network, or artificial neural network, is a subset of machine learning that contains an input layer, one or more hidden layers, and an output layer. Each node, or artificial neuron, connects to another and has an associated weight and threshold. If the output of any individual node is above a specified threshold value, that node is activated, sending data to the next layer of the network. There are various types of neural networks, such as modular neural networks, recurrent neural networks, generative adversarial networks, deep neural networks, spiking neural networks, feedforward neural networks, and physical neural networks.

To make predictions with a neural network, the data input is passed through many layers of multiplication with the learned weights and through nonlinear transformations. A single prediction can involve millions of mathematical operations depending on the architecture of the neural network. Thus, it is difficult for humans to follow the exact mapping from data input to prediction. Millions of weights would potentially have to be considered that interact in a complex way to understand a prediction provided by a neural network. Currently, specific interpretation methods are used to interpret the behavior and predictions of neural networks.

While model-agnostic methods, such as local models or partial dependence plots, can be used, interpretation methods are commonly preferred because they can be designed specifically for neural networks. Additionally, neural networks learn features and concepts in their hidden layers, and special tools are usually needed to uncover them. Also, the gradient can be utilized to implement interpretation methods that are more computationally efficient than model-agnostic methods that look at the model "from the outside."

Limitations on interpreting neural networks remain, however, as a single prediction can involve millions of mathematical operations depending on the architecture of the neural network. The complexity makes it nearly impossible for humans to follow the exact mapping from data input to prediction. A consideration of millions of weights that interact in a complex way is needed to understand a prediction by a neural network.

Embodiments of the present disclosure may overcome the above, and other problems, by providing a continued fractions neural network architecture (CoFrNet) that can be efficiently trained as well as interpreted leveraging the continued fractions functional form. The CoFrNet can be considered as a universal approximator based on a proof strategy different from typical strategies used to prove universal approximation results for neural networks based on infinite width.

Continued fractions are expressions obtained through an iterative process of representing a number as the sum of its integer part and the reciprocal of another number, then writing this other number as the sum of its integer part and another reciprocal, and so on. In a finite continued fraction (or terminated continued fraction), the iteration/recursion is terminated after finitely many steps by using an integer in lieu of another continued fraction. In contrast, an infinite continued fraction is an infinite expression. In either case, all integers in the sequence, other than the first, must be positive.

The generalized form for a continued fraction is represented in Equation 1, as seen below:

$$a_0 + \cfrac{b_1}{a_1 + \cfrac{b_2}{a_2 + \ldots}} \qquad \text{Equation 1}$$

Where $a_i$ and $b_i$ can be any complex number. Equation 1 can be represented in a canonical form if $a_i$ and $b_i$ are not zero. A property of continued fractions is that in representing real numbers with natural number parameters $a_i, b_i \in \mathbb{N}$, the rational approximations formed by any of its finite truncations (termed convergent) are closer to the true value than any other rational number with the same or smaller denominator. Thus, continued fractions can precisely represent a rational approximation.

More specifically, embodiments of the disclosure provide techniques to implement a neural network with a CoFrNet architecture such that the output of the neural network is a linear combination of the ladder structure created by the layers below it. In one embodiment, the CoFrNet provides a variant where each ladder receives the whole input x at every stage. In another embodiment, CoFrNet is a diagonalized variant where each ladder only receives one of the input dimensions $x_i$ and hence is an additive model. In another embodiment, CoFrNet is a combination of the diagonalized variant and the full variant. The full ladders are of increasing depth and can be understood to capture the respective order of the interactions.

In some embodiments, the CoFrNet is interpretable using continuant that computes a gradient for each of the continued fractions layers with respect to their inputs. Continuants are multivariate polynomials that represent the determinant of a tridiagonal matrix. A continuant equation can be utilized as a means to compute the gradient of a ladder with respect to its inputs.

In some embodiments, the CoFrNet is interpretable using an interpretation power series that represents each of the continued fractions layers as a multivariate power series. The use of continuants may only provide first-order attributions, so to obtain higher-order terms as well as first-order, the ladder is represented as a multivariate power series. A linear combination of ladders, which the CoFrNet entails, can also be represented by a multivariate power series by summing the coefficients for each monomial term.

FIG. 1 is a block diagram illustrating a neural network training environment 100 for the training of neural networks with continued fractions architectures. The neural network training environment 100 includes a training dataset 110, an input layer 142, and a neural network 140. For purposes of the present description, it will be assumed that the illustrative embodiments are being implemented as part of a machine learning training methodology. However, this is only one possible implementation and is not intended to be limiting to the present disclosure. Other implementations in which neural networks are utilized may also be used without departing from the spirit and scope of the present disclosure.

The training dataset 110 is a set of data the neural network training environment 100 used as training data for the neural network 140. The training dataset 110 includes a collection of samples, with each sample containing one or more features and a label. In some embodiments, the training dataset 110 is divided into a training set, a validation set, and a test set. The validation set can be a subset of the training dataset 110 for use in validating a pseudo labeled dataset produced by the neural network 140. The test set can also be a subset of the training dataset 110 used to test the neural network 140 after training and validation.

The training dataset 110 may, for example, be used for image classification, in which case the training data may comprise images with known classifications. The training dataset 110 may also include data in the form of a tabular dataset or text.

The neural network 140 is a component of the neural network training environment 100 trained based on the training dataset 110 inputted. The neural network 140 can include multiple neurons (nodes) arranged in various layers. The neurons form adjacent layers, including connections or edges between them. Each connection between neurons can have a weight associated with them that can assist the neural network 140 in evaluating the input received.

The input layer 142 is a layer of the neural network 140 configured to provide information to the neural network 140. The input layer 142 can receive input, such as tabular, text, and image data, to feed into the neural network 140. In some embodiments, the input layer 142 can input additional information into the neural network 140. For example, the input layer 142 can input the type of variant the neural network 140 is configured in.

The hidden layers 144 are layers of the neural network 140 configured to perform computations and transfer information from one layer to another layer. The hidden layers 144 can comprise a collection of hidden neurons to form hidden layers 144. While only shown as three layers, with each layer having four neurons in FIG. 1, it will be appreciated that the neural network 140 can include multiple hidden layers with multiple neurons in each layer depending on the configuration of the neural network 140.

In some embodiments, the hidden layers 144 are configured to calculate a function of a continued fraction in canonical form. For instance, a continued fraction can be expressed as the following:

$$f(x; w) = a_0 + \cfrac{1}{a_1 + \cfrac{1}{\cdots \cfrac{}{a_{d-1} + \cfrac{1}{a_d}}}}, \; a_k = w_k^T x \qquad \text{Equation 2}$$

Figure 2:
FIG. 2 is a block diagram illustrating a ladder formation using functions of a continued fraction in canonical form and used by one or more embodiments of the present disclosure.
Figure 2:
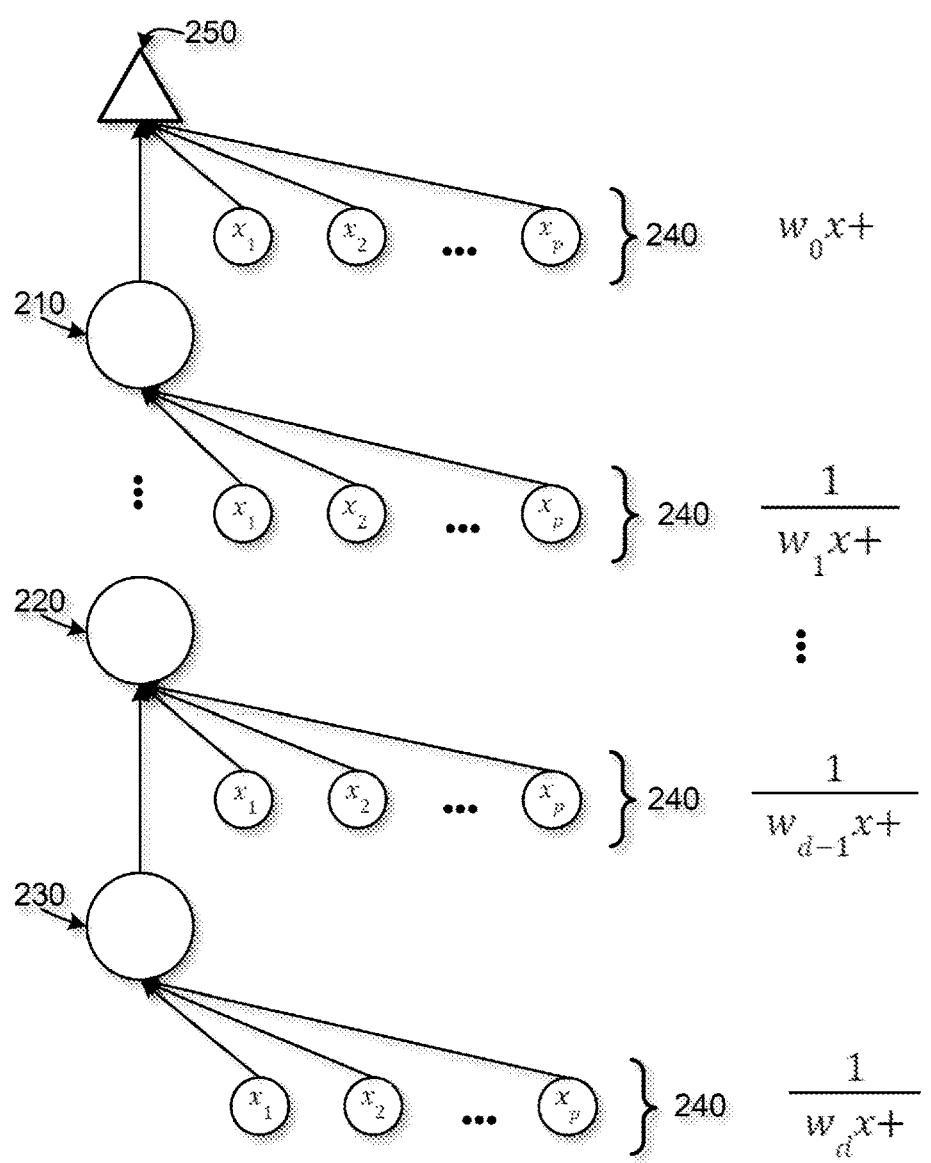

In this example, the numerators are expressed as 1 (illustration purposes only), and the denominators $$a_k = w_k^T x$$

are expressed as linear functions of the input x. The variable d denotes the depth of the continued fraction and $w_k$ represents the weight of each function. Each such function can correspond to a hidden layer 144 or "ladder" due to a pictorial representation with a rail and rungs that carry the input to each node. FIG. 2 illustrates the representation of the ladder-like structure.

During the training stage, the neural network 140 learns optimal weights for each neuron. An optimal configuration can then be applied to test data. During training, the input data from the input layer 142 is passed to all layers, linear function with weight$w_k$ are computed, and the nonlinear activation function can be the reciprocal $z \rightarrow 1/z$. All variants can be differentiable and can thus be trained using standard techniques such as the Alternating Direction Method of Multipliers (ADMM) and backpropagation using frameworks such as TensorFlow or PyTorch. Additionally, dropout techniques can also be utilized for improved generalization.

Overfitting and underfitting the inputted data can be addressed and regulated through dropout techniques. Low bias can result in the neural network 140 overfitting the data, and high bias can result in the neural network 140 underfitting the data. Overfitting occurs when the neural network 140 learns its training data well but cannot generalize beyond the training data. Underfitting occurs when the neural network 140 is not able to generate accurate predictions on the training data or on validation data.

Dropout, also commonly referred to as dilution or dropconnect, is a regularization technique for reducing overfitting in neural networks. The dropout technique includes omitting neurons (both hidden and visible) during the training process of the neural network 140. Additionally, the weights associated with the synapses can be lowered, or "thinned", separately or in conjunction with omitting neurons.

The process by which the neuron is dropped, or driven to zero, can be achieved by setting the weights to zero, ignoring the neuron, or by any other means that negates the calculation of the neuron and that does not impact the end result or create a new and unique case.

Once trained, exemplary applications of such a neural network 140 include image classification, object recognition, speech recognition, and/or data that may be considered sensitive, private, privileged, personal, and/or confidential, represented as output 146.

In some embodiments, the activation function is slightly altered to handle poles. An issue may arise from the $$\frac{1}{z}$$

reciprocal nonlinearity is that the denominator may go to zero during training, leading to the function being undefined at that point (a pole in the context of rational functions). Embodiments can resolve this issue by altering the activation function to sgn $$(z)\frac{1}{\max(|z|,\ \epsilon)}$$

for some $\epsilon > 0$, where $|\cdot|$ denotes absolute value. The $\epsilon$ can be fixed to a small positive value or tuned during training. Other solutions can involve either restricting each of the denominators to be positive or the final denominator of the rational function to be positive.

In some embodiments, the neural network 140 is interpreted using continuants. Continuants are multivariate polynomials that represent the determinant of a tridiagonal matrix. Using continuants, the neural network can be interpreted using the following equation:

$$\frac{\partial f(x;w)}{\partial x_j} = \sum_{k=0}^{d}(-1)^k\left(\frac{K_{d-k}(a_{k+1},\ \ldots\ ,a_d)}{K_d(a_1,\ \ldots\ ,a_d)}\right)^2 w_{jk} \qquad \text{Equation 3}$$

Where Equation 3 provides a computationally efficient means to compute the gradient of a ladder with respect to its inputs. Given an input x, and assuming that the linear functions $$a_k = w_k^T x$$

have been computed in evaluating f(x;w), the continuants $K_k$ can be computed using recursion in O(d) operations. Then, for each input $x_j$, the sum from Equation 3 also requires O(d) operations for a total of O(dp) operations for all $x_j$, weighted by ratios of continuants and with alternating signs.

In some embodiments, the neural network 140 is interpreted using power series. The use of continuants may only provide first-order attributions, so to obtain higher-order terms as well as first-order, the ladder, or hidden layers 144, is represented as a multivariate power series. A linear combination of ladders, which the neural network 140 architecture entails, can also be represented by a multivariate power series by summing the coefficients $c_{i_1},\ \ldots\ ,i_p$ for each monomial term. These coefficient sums thus provide attributions for individual features $x_j$ as well as higher-order interactions, up to the depth of the ladders.

For low-depth ladders, it is possible to equate and find the appropriate coefficients based on linear recurrence relation. However, when manual computation is too laborious symbolic manipulation tools such as Mathematica® (Mathematica® and all Mathematica-based trademarks are trademarks or registered trademarks of Wolfram Research Inc. in the United States, and/or other countries) can be used. For a function g that is a linear combination of ladder f of depth d, the power series expansion up to order dp can be obtained by applying the following operation:

$$N[\text{Normal Series}[g,\{x_1,0,d\},\ \ldots\ ,\{x_p,0,d\}]]] \qquad \text{Equation 4}$$

Where "Series" produces a Taylor series expansion, "Normal" implies normalized form, and "N" represents fractions coefficients as decimals. The appropriate coefficients can then be picked off to determine feature attributions for interactions.

It is noted that FIG. 1 is intended to depict the representative major components of an exemplary neural network training environment 100. In some embodiments, individual components may have greater or less complexity than as represented in FIG. 1, components other than or in addition to those shown in FIG. 1 may be present, and the number, type, and configuration of such components may vary.

FIG. 2 is a block diagram illustrating a single ladder 200 representation of the CoFrNet architecture, in accordance with embodiments of the present disclosure. The single ladder 200 includes layers 210, 220, 230, and output 250 (which can be the same as, or substantially similar to, the output 146 of FIG. 1). Each layer 210, 220, 230, and the output 250 receives the entire input 240 for calculation. The single ladder illustrates an architecture of depth d where the depth corresponds to the number of functions of the continued fraction in canonical form.

The input 240 (which can be the same as, or substantially similar to, the input 142 of FIG. 1) is provided to every layer 210, 220, 230 for calculation. Additionally, the continued fraction being calculated is represented in canonical form, with each layer configured to calculate one function of the continued fraction using the provided input 240 and output from the previous layer.

Figure 3:
FIG. 3 is a block diagram illustrating a full-fledged variant of a continued fraction neural network architecture and used by one or more embodiments of the present disclosure.
Figure 3:
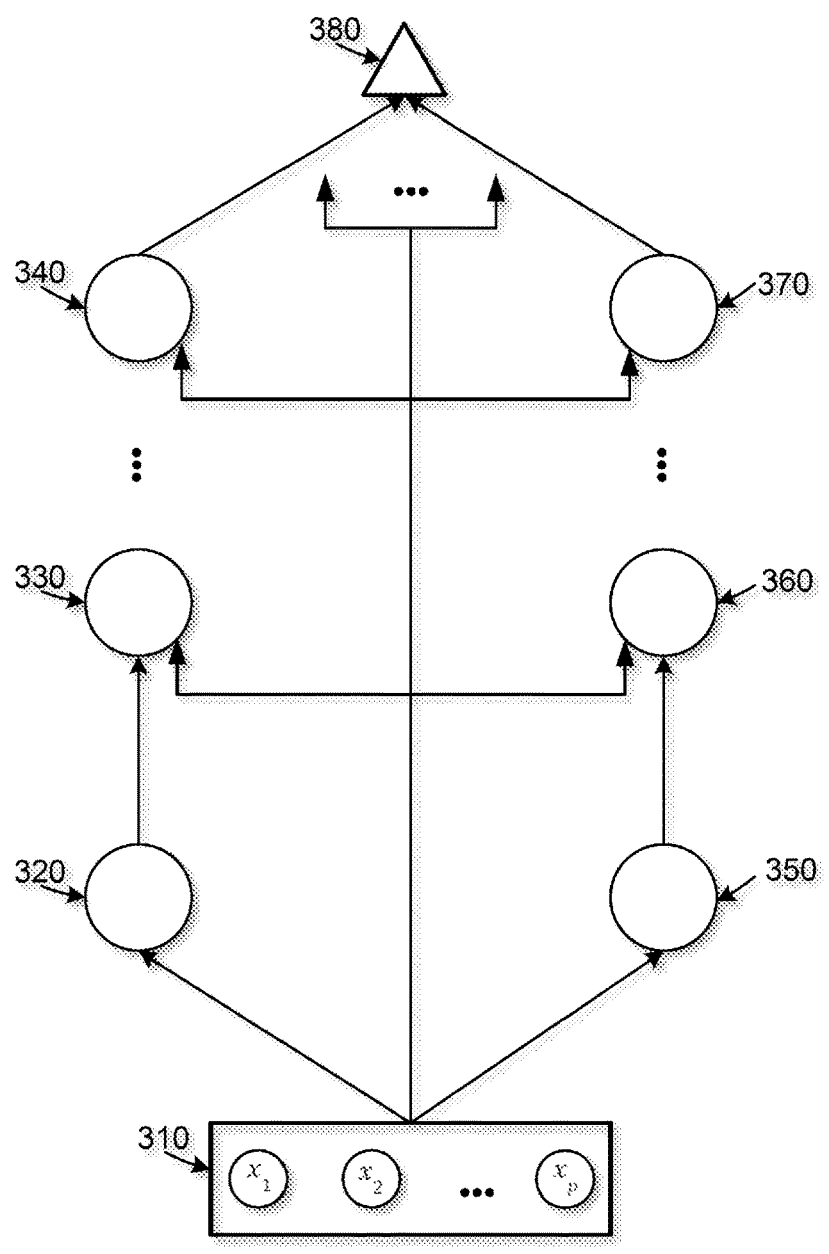

FIG. 3 is a block diagram illustrating a full-fledged variant 300 representation of the CoFrNet architecture, in accordance with embodiments of the present disclosure. The full full-fledged variant 300 includes input 310 (which can be the same as, or substantially similar to, the input 142 of FIG. 1), layers 320, 330, 340, 350, 360, 370 (which can be the same as, or substantially similar to, the hidden layers 144 of FIG. 1), and output 380 (which can be the same as, or substantially similar to, the output 146 of FIG. 1).

Figure 4:
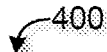
FIG. 4 is a block diagram illustrating a diagonalized variant of a continued fraction neural network architecture and used by one or more embodiments of the present disclosure.
Figure 4:
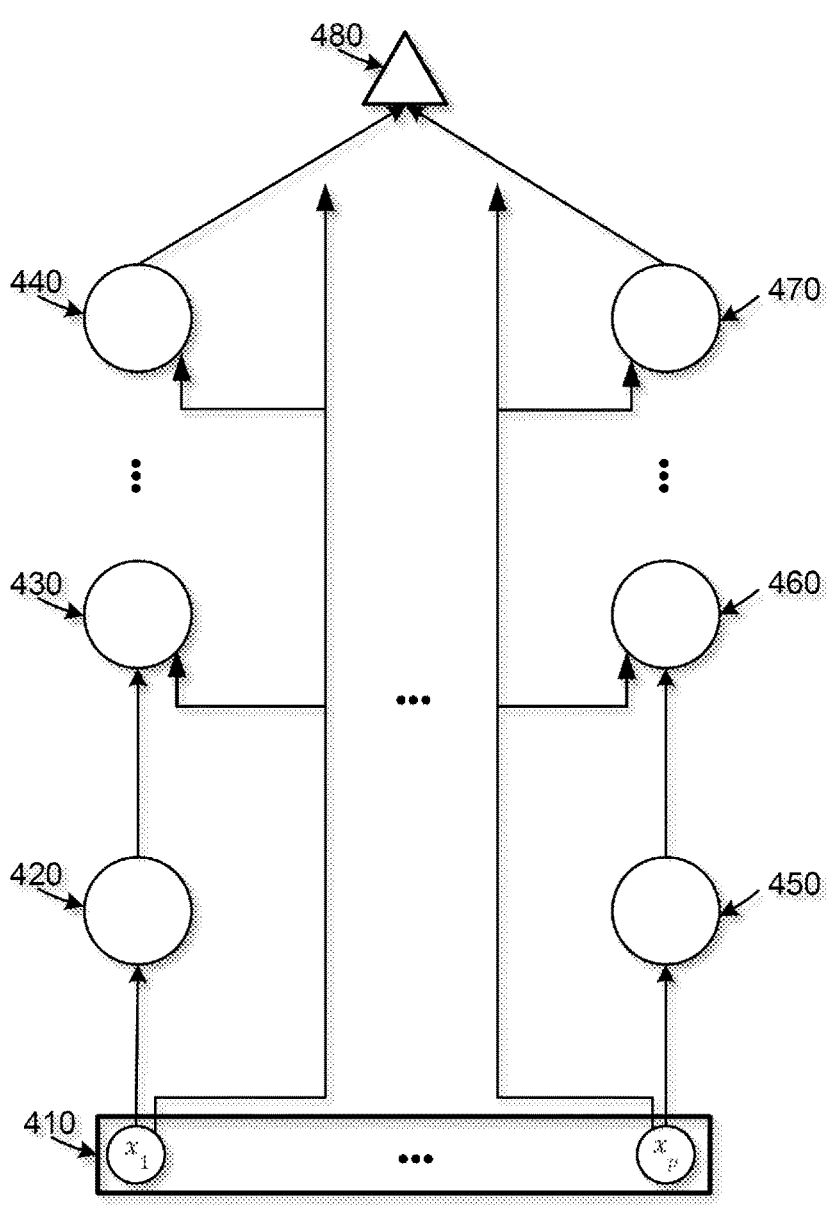

The full-fledged variant 300 demonstrates a CoFrNet architecture where each layer, or ladder, receives the whole input x at every stage. This variant is possibly the least interpretable, but nonetheless the most powerful of the three variants FIG. 4 is a block diagram illustrating a diagonalized variant 400 representation of the CoFrNet architecture, in accordance with embodiments of the present disclosure. The diagonalized variant 400 includes input 410 (which can be the same as, or substantially similar to, the input 142 of FIG. 1), layers 420, 430, 440, 450, 460, 470 (which can be the same as, or substantially similar to, the hidden layers 144 of FIG. 1), and output 480 (which can be the same as, or substantially similar to, the output 146 of FIG. 1).

Figure 5:
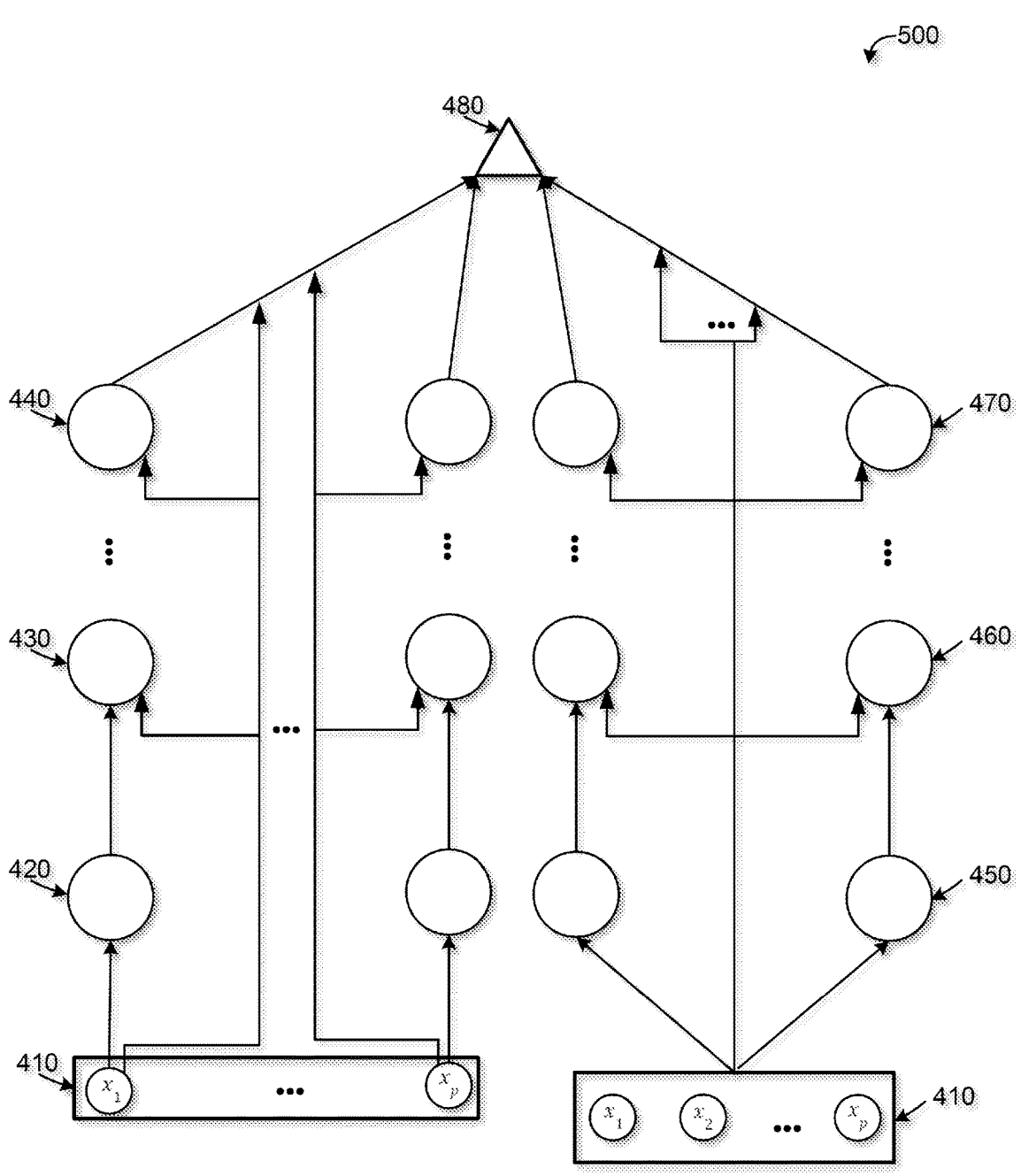
FIG. 5 is a block diagram illustrating a combined variant of a continued fraction neural network architecture and used by one or more embodiments of the present disclosure.

The diagonalized variant 400 demonstrates a CoFrNet architecture where each layer only receives one of the input dimensions $x_i$ of the input 410. This variant is possibly the least powerful, but nonetheless the most interpretable of the three variants FIG. 5 is a block diagram illustrating a combined variant 500 representation of the CoFrNet architecture that is a combination of the diagonalized variant and the full variant, in accordance with embodiments of the present disclosure. The combined variant 500 includes input 510 (which can be the same as, or substantially similar to, the input 142 of FIG. 1), layers 520, 530, 540, 550, 560, 570 (which can be the same as, or substantially similar to, the hidden layers 144 of FIG. 1), and output 580 (which can be the same as, or substantially similar to, the output 146 of FIG. 1).

The combined variant 500 demonstrates a CoFrNet architecture where half of the layer receives the whole input x at every stage, and the other half receives one of the input dimensions x_i of the input 510. This variant lies in between the full-fledged and diagonalized variants and in some sense has benefits of both as it is easy to interpret for at least first order interactions, but also powerful like the full-fledged variant.

Figure 6:
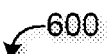
FIG. 6 is a flow diagram illustrating a process of training a neural network performed in accordance with embodiments of the present disclosure.
Figure 6:
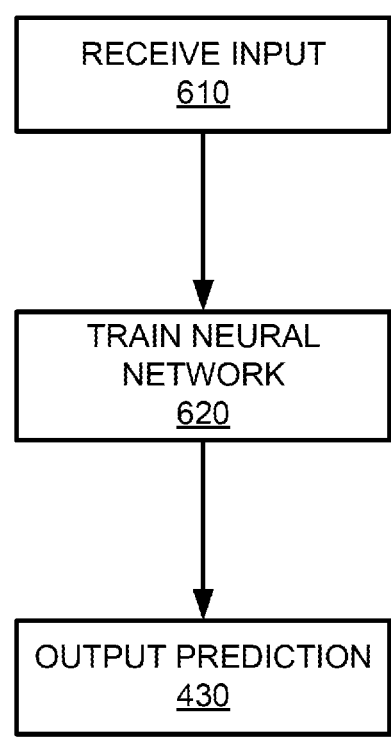
Figure 7:
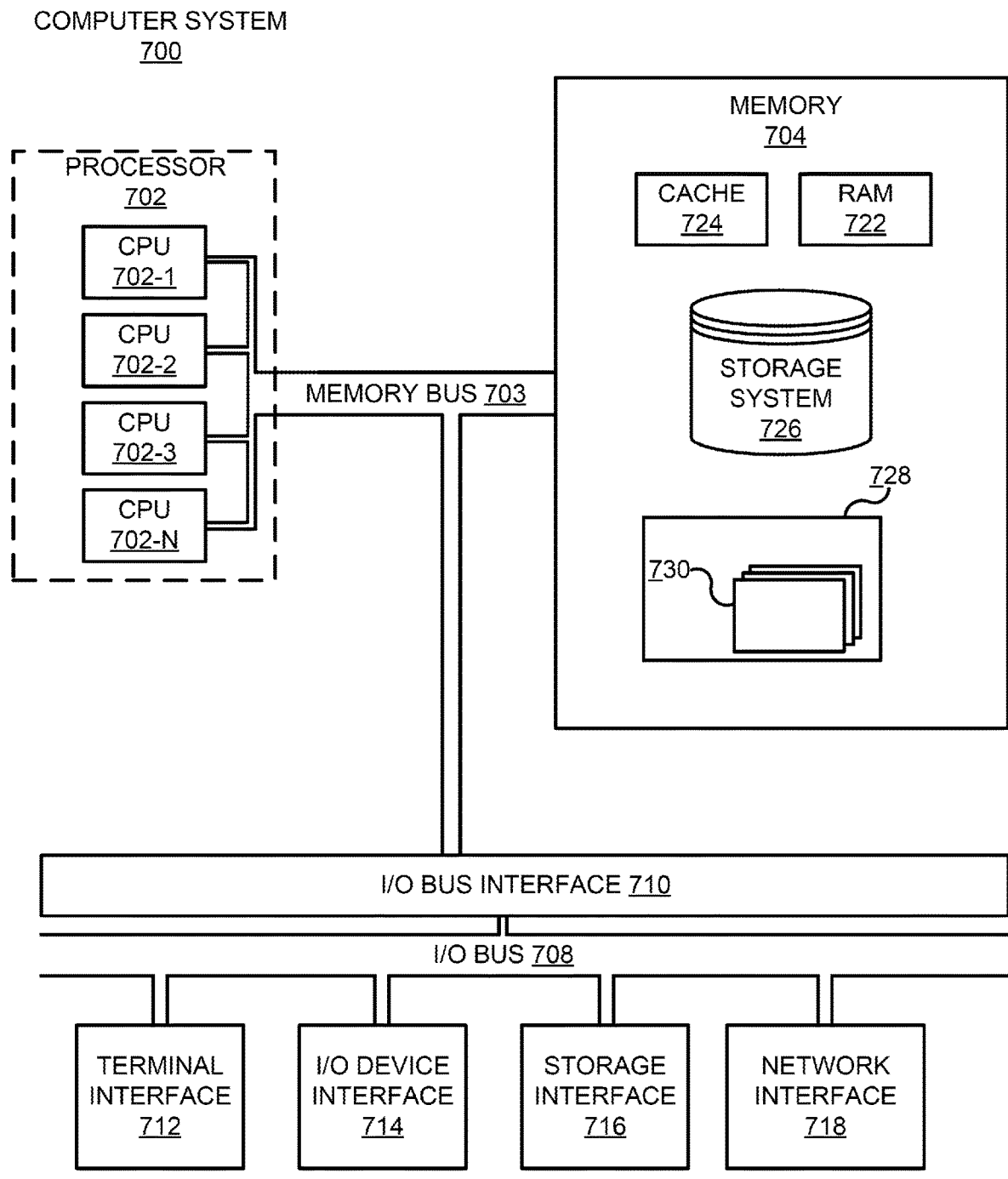
FIG. 7 is a high-level block diagram illustrating an example computer system that may be used in implementing one or more of the methods, tools, modules, and any related functions described herein in which the disclosure may be implemented.

FIG. 6 is a flow diagram illustrating a process 600 of training a neural network with a CoFrNet architecture, in accordance with embodiments of the present disclosure. As shown in FIG. 7, the process 600 beings by receiving, via an input to the neural network 140, a training dataset 110. This is illustrated at step 610. The training dataset can include a collection of samples, with each sample containing one or more features and a label. In some embodiments, the training dataset 110 is divided into a training set, a validation set, and a test set. The validation set can be a subset of the training dataset 110 for use in validating a pseudo labeled dataset produced by the neural network 140.

The neural network 140 trains the received input 142. This is illustrated at step 620. Once the variant of the CoFrNet architecture is determined and configured, the neural network 140 can start with the first received input 142 from the training dataset 110, and input into the neural network 140. In an iterative or recursive manner, training continues. In some embodiments a dropout technique is applied to account for regularization. The iterative process continues by inputting the next input 142 until a stopping metric is produced by the neural network 140. The stopping metric can interrupt training when a neural network's performance on a validation set begins to decline or when the neural network 140 achieves a predetermined level of accuracy. At each iteration, the neural network 140 outputs a prediction based on the input 142. This is illustrated at step 630.

Referring now to FIG. 7, shown is a high-level block diagram of an example computer system 700 (e.g., the neural network training environment 100, CoFrNet) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 700 may comprise one or more processors 702, a memory 704, a terminal interface 712, an I/O (Input/Output) device interface 714, a storage interface 716, and a network interface 718, all of which may be communicatively coupled, directly or indirectly, for inter-component communication via a memory bus 703, an I/O bus 708, and an I/O bus interface 710.

The computer system 700 may contain one or more general-purpose programmable central processing units (CPUs) 702-1, 702-2, 702-3, and 702-N, herein generically referred to as the processor 702. In some embodiments, the computer system 700 may contain multiple processors typical of a relatively large system; however, in other embodiments, the computer system 700 may alternatively be a single CPU system. Each processor 702 may execute instructions stored in the memory 704 and may include one or more levels of onboard cache.

The memory 704 may include computer system readable media in the form of volatile memory, such as random-access memory (RAM) 722 or cache memory 724. Computer system 700 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

Although the memory bus 703 is shown in FIG. 7 as a single bus structure providing a direct communication path among the processors 702, the memory 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 700 may, in some embodiments, contain multiple I/O bus interface units, multiple I/O buses, or both. Further, while multiple I/O interface units are shown, which separate the I/O bus 708 from various communications paths running to the various I/O devices, in other embodiments, some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the major representative components of an exemplary computer system 700. In some embodiments, however, individual components may have greater or lesser complexity than as represented in FIG. 7, components other than or in addition to those shown in FIG. 7 may be present, and the number, type, and configuration of such components may vary.

One or more programs/utilities 728, each having at least one set of program modules 730 (e.g., the neural network training environment 100, CoFrNet), may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, references to "models" or a "model" in the present description specifically refers to computer executed machine learning models. These models comprise algorithms, statistical models, and the like, that computer systems use to perform a specific task without using explicit instructions, but instead relying on patterns and inference instead. Machine learning algorithms build a computer executed model based on sample data, known as "training data", in order to make predictions or decisions without being explicitly programmed to perform the task. Examples of machine learning models include, but are not limited to, supervised machine learning models such as convolutional neural networks (CNNs), deep neural networks (DNNs), and the like, as well as unsupervised machine learning models such as Isolation Forest models, One-Class Support Vector Machine (SVM) models, Local Outlier Factor models, and the like, ensemble learning mechanisms such as Random Forest models, and the like.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of implementing an architecture of a neural network, the method further comprising:

receiving, via an input layer of the neural network, input data x having dimensionality p, wherein $x_j$ represents a dimension of the input data x for j=1, 2, . . . , p;

training the neural network via passing the input data x from the input layer through a plurality of continued fractions layers of the neural network to generate output data, wherein each continued fractions layer is configured, via learning optimal weights associated with its respective neurons, to calculate one or more linear functions of its respective input and generate, via nonlinear activation functions of its respective neurons, an output that is used as input for a subsequent continued fractions layer, wherein the output of each neuron of each continued fractions layer is computed using reciprocal function z−>1/z as the nonlinear activation function, wherein the architecture of the neural network is a linear combination of a plurality of ladders, each ladder comprising a plurality of continued fractions layers, and wherein the architecture of the neural network is one of a set of variants, the set of variants including at least one of:

a full-fledged variant wherein each ladder receives as input all dimensions of the input data x, a diagonalized variant wherein each ladder receives as input only one dimension $x_j$ of the input data x, and a combined variant that is a combination of the full-fledged variant and the diagonalized variant, wherein at least one of its ladders receives as input all dimensions of the input data x, and at least one of its ladders receives as input only one dimension $x_j$ of the input data x; and outputting, from the neural network, the output data.

2. The computer-implemented method of claim 1, wherein each continued fractions layer is configured to calculate at least one linear function of a continued fraction in canonical form.

3. The computer-implemented method of claim 1, wherein the neural network is interpretable using continuants to compute a gradient for each continued fractions layer with respect to its inputs, wherein the continuants are multivariate polynomials representing a determinant of a tridiagonal matrix and the computed gradients are utilized in providing first-order attributions.

4. The computer-implemented method of claim 1, wherein the neural network is interpretable using an interpretation power series that represents each continued fractions layer as a multivariate power series.

5. The computer implemented method of claim 1, wherein all variants in the set of variants are differentiable and are trained using Alternating Direction Method of Multipliers (ADMM) and back propagation, and wherein one or more dropout techniques are utilized for improved generalization.

6. The computer implemented method of claim 1, further comprising:

altering the nonlinear activation function to handle poles, wherein the nonlinear activation function is altered to $$\operatorname{sgn}(z)\frac{1}{\max(|z|, \epsilon)}$$

for some $\epsilon > 0$, where |·| denotes absolute value, and wherein the E is fixed to a small positive value or tuned during the training.

7. The computer implemented method of claim 1, wherein the neural network is interpreted using a multivariate power series to obtain higher-order terms by summing coefficients for each monomial term of the multivariate power series, wherein coefficient sums provide attributions for individual dimensions $x_j$ and higher-order interactions up to a depth of the plurality of ladders.

8. The computer implemented method of claim 7, further comprising:

determining appropriate coefficients based on a linear recurrence relation or by using one or more symbolic manipulation tools.

9. A computer program product comprising a computer readable storage medium having computer readable instructions stored therein, wherein the computer readable instructions, when executed on a computing device, causes the computing device to perform operations to implement an architecture of a neural network, the operations comprising:

receiving, via an input layer of the neural network, input data x having dimensionality p, wherein $x_j$ represents a dimension of the input data x for j=1, 2, . . . , p;

training the neural network via passing the input data x from the input layer through a plurality of continued fractions layers of the neural network to generate output data, wherein each continued fractions layer is configured, via learning optimal weights associated with its respective neurons, to calculate one or more linear functions of its respective input and generate, via nonlinear activation functions of its respective neurons, an output that is used as input for a subsequent continued fractions layer, wherein the output of each neuron of each continued fractions layer is computed using reciprocal function z−>1/z as the nonlinear activation function, wherein the architecture of the neural network is interpretable as a linear combination of a plurality of ladders, each ladder comprising a plurality of continued fractions layers, and wherein the architecture of the neural network is one of a set of variants, the set of variants including at least one of:

a full-fledged variant wherein each ladder receives as input all dimensions of the input data x, a diagonalized variant wherein each ladder receives as input only one dimension $x_j$ of the input data x, and a combined variant that is a combination of the full-fledged variant and the diagonalized variant, wherein at least one of its ladders receives as input all dimensions of the input data x, and at least one of its ladders receives as input only one dimension $x_j$ of the input data x; and outputting, from the neural network, the output data.

10. The computer program product of claim 9, wherein each continued fractions layer is configured to calculate at least one linear function of a continued fraction in canonical form.

11. The computer program product of claim 9, wherein the neural network is interpretable using continuants to compute a gradient for each continued fractions layer with respect to its inputs, wherein the continuants are multivariate polynomials representing a determinant of a tridiagonal matrix and the computed gradients are utilized in providing first-order attributions.

12. The computer program product of claim 9, wherein the neural network is interpretable using an interpretation power series that represents each continued fractions layer as a multivariate power series.

13. A computer system comprising:

a processor set;

one or more computer-readable storage media; and program instructions stored on the one or more computer-readable storage media to cause the processor set to perform operations to implement an architecture of a neural network, the operations comprising:

receiving, via an input layer of the neural network, input data x having dimensionality p, wherein $x_j$ represents a dimension of the input data x for j=1, 2, . . . , p;

training the neural network via passing the input data x from the input layer through a plurality of continued fractions layers of the neural network to generate output data, wherein each continued fractions layer is configured, via learning optimal weights associated with its respective neurons, to calculate one or more linear functions of its respective input and generate, via nonlinear activation functions of its respective neurons, an output that is used as input for a subsequent continued fractions layer, wherein the output of each neuron of each continued fractions layer is computed using reciprocal function $z->1/z$ as the nonlinear activation function, wherein the architecture of the neural network is interpretable as a linear combination of a plurality of ladders, each ladder comprising a plurality of continued fractions layers, and wherein the architecture of the neural network is one of a set of variants, the set of variants including at least one of:

a full-fledged variant wherein each ladder receives as input all dimensions of the input data x, a diagonalized variant wherein each ladder receives as input only one dimension $x_j$ of the input data x, and a combined variant that is a combination of the full-fledged variant and the diagonalized variant, wherein at least one of its ladders receives as input all dimensions of the input data x, and at least one of its ladders receives as input only one dimension $x_j$ of the input data x; and outputting, from the neural network, the output data.

* * * * *